United States Patent
Lecourtier et al.

(10) Patent No.: US 6,516,040 B1
(45) Date of Patent: Feb. 4, 2003

(54) INTERCONNECTION PROCESS AND INTERFACE USING PARALLELIZED HIGH-SPEED SERIAL LINKS

(75) Inventors: Georges Lecourtier, Versailles (FR); Anne Kaszynski, Ablis (FR)

(73) Assignee: Bull, S.A., Louveciennes (FR)

(*) Notice: Subject to any disclaimer, the term of this patent is extended or adjusted under 35 U.S.C. 154(b) by 0 days.

(21) Appl. No.: 09/373,726

(22) Filed: Aug. 13, 1999

(30) Foreign Application Priority Data

Aug. 13, 1998 (FR) .............................. 98 10402

(51) Int. Cl.⁷ .............................................. H04L 7/00
(52) U.S. Cl. ...................................... 375/356; 370/503
(58) Field of Search .............................. 375/354, 356, 375/358, 365, 369; 370/503, 507, 509, 512, 514; 327/141, 144

(56) References Cited

U.S. PATENT DOCUMENTS 5,682,408 A    10/1997  Kouji
5,764,965 A *  6/1998  Poimboeuf et al.

FOREIGN PATENT DOCUMENTS

| EP | 0533091 | 3/1993 |
| EP | 0565890 | 10/1993 |
| EP | 0659001 | 6/1995 |

* cited by examiner

*Primary Examiner*—Jean Corrielus
(74) *Attorney, Agent, or Firm*—Miles & Stockbridge P.C.; Edward J. Kondracki

(57) ABSTRACT

A process and interface for interconnection of multiprocessor modules by point-to-point serial-to-parallel links. Data processing or data communication modules (A and B) are interconnected by means of high-speed point-to-point serial links conveying multiplexed information organized into frames comprising a start-of-frame recognition pattern. The process, on transmission and on reception, performs an analog synchronization of the basic clocks of the modules to a reference clock generated by one of the modules designated as a reference module, called the master module, the other modules being called slave modules, and a digital synchronization of the start-of-frame of each slave module to the start-of-frame sent by the master module.

21 Claims, 10 Drawing Sheets

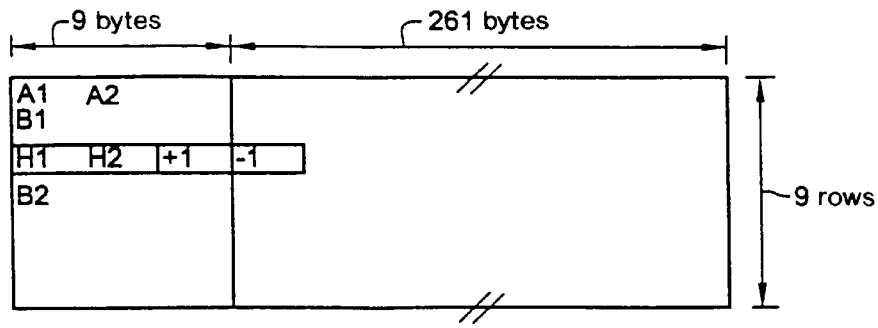
FIG. 1
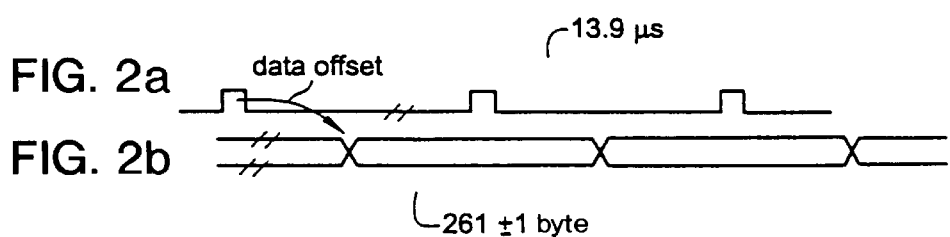
FIG. 2a
FIG. 2b
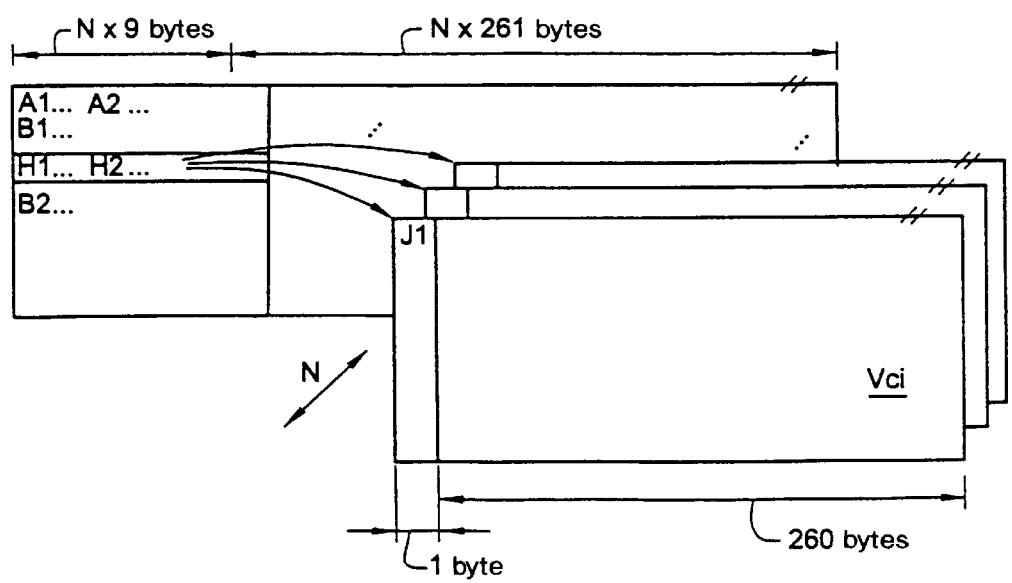
FIG. 3

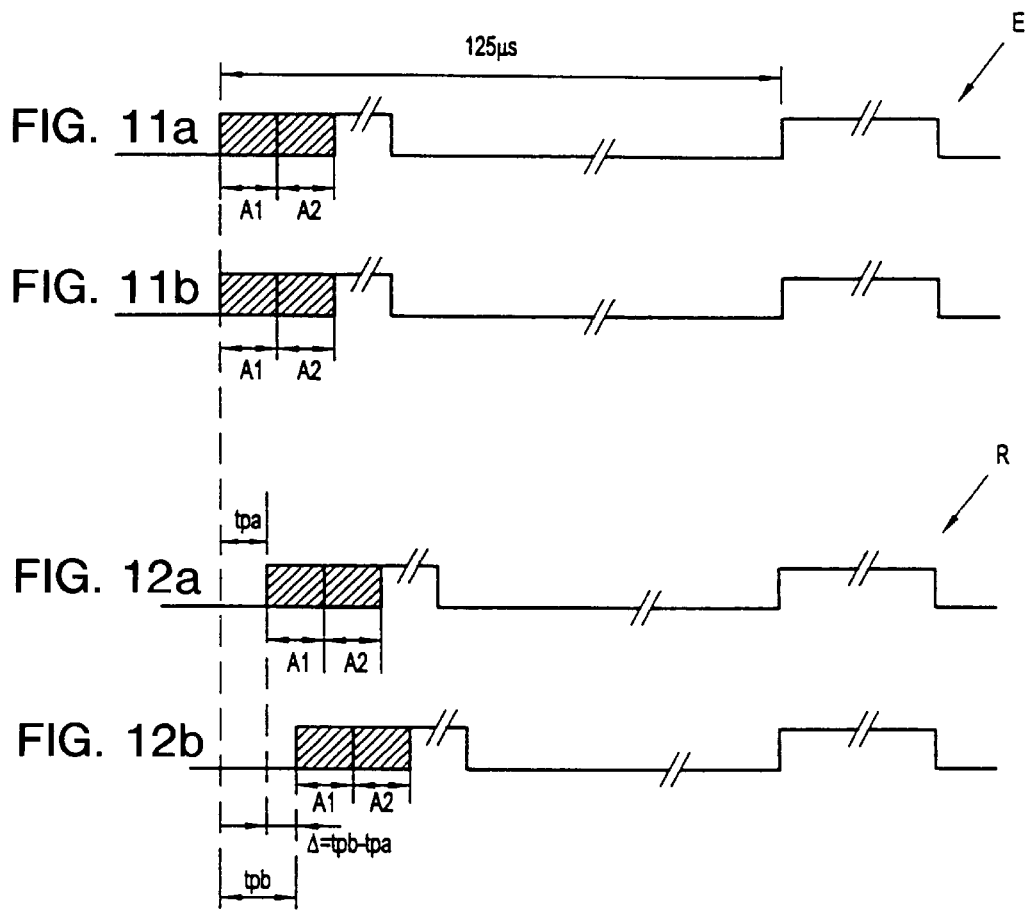
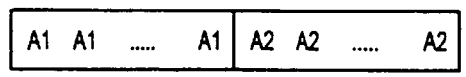
FIG. 10

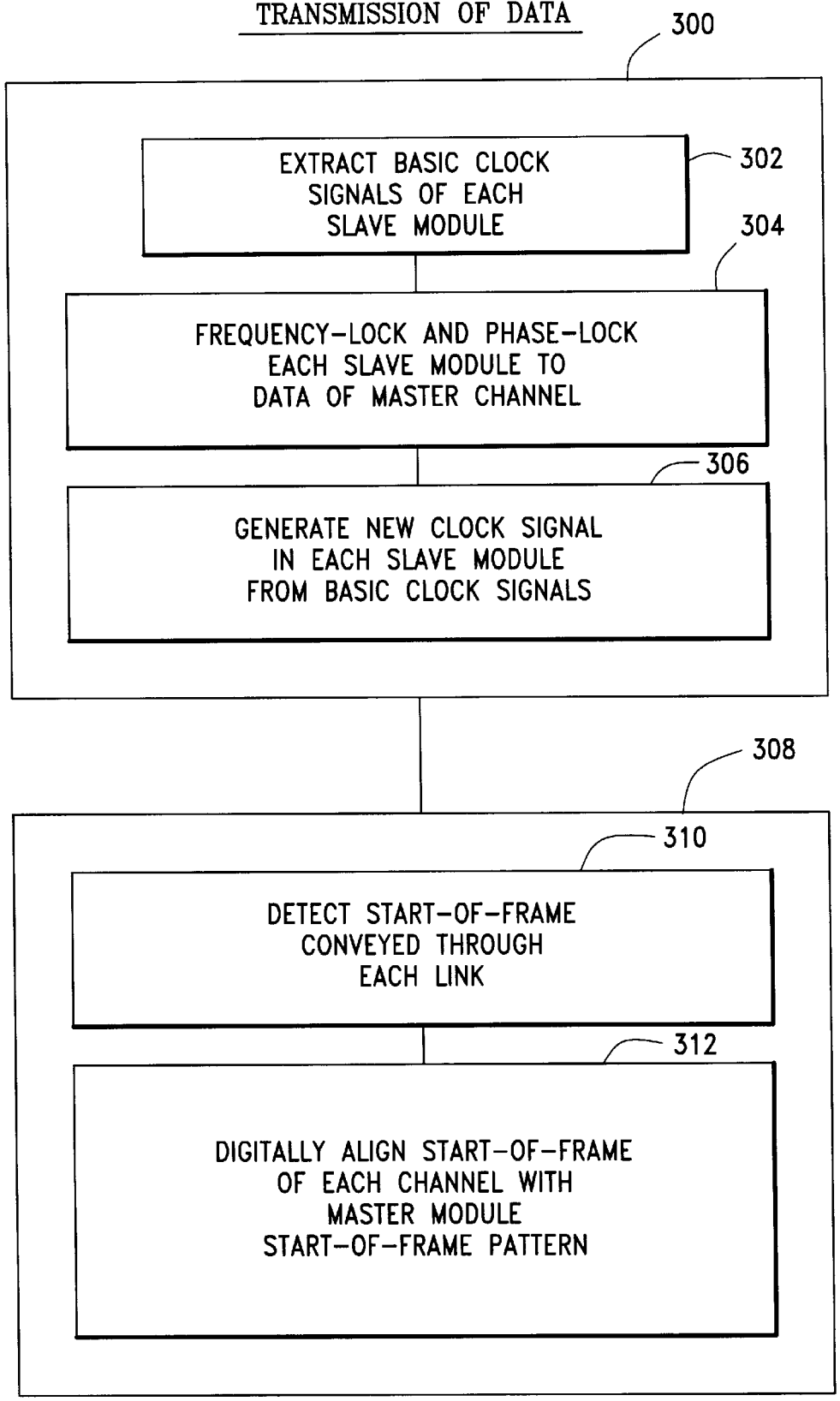

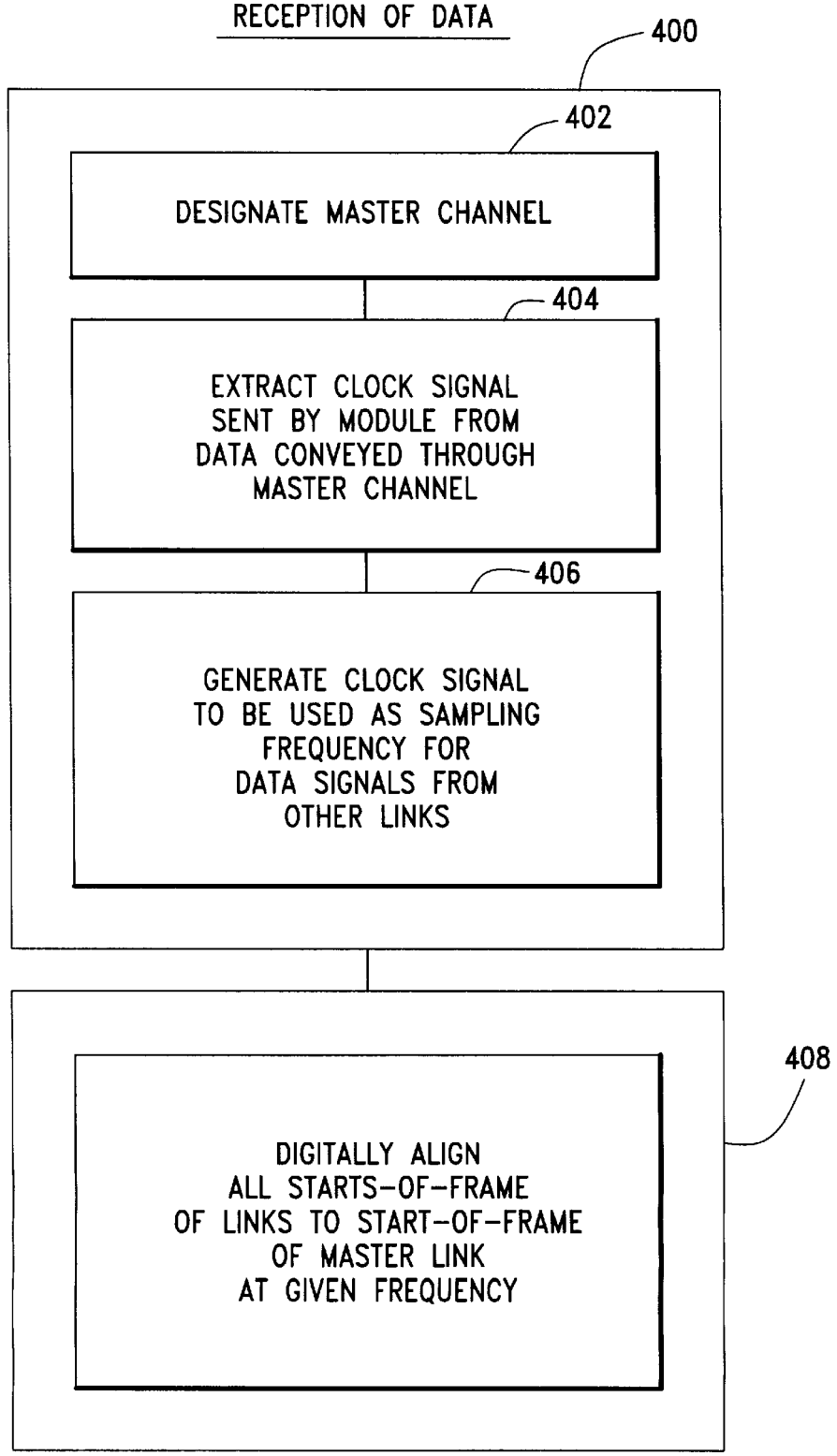

INTERCONNECTION PROCESS AND INTERFACE USING PARALLELIZED HIGH-SPEED SERIAL LINKS

FIELD OF THE INVENTION

The present invention relates to the field of high-speed networks, and more particularly to interconnected networks constituted by high-speed serial links connecting nodes of data processing systems or data communication systems, hereinafter called modules.

Hereinafter, and in general, the connection of two modules that are remote from one another is called a linkage or link.

The invention is described below based on the protocol SDH, the abbreviation for Synchronous Digital Hierarchy, defined by the ITU, the abbreviation for "International Telecommunication Union," in its G.708, G.709 and G.783 guidelines.

However, the invention is not limited to the utilization of this protocol, which is given as an example to provide a good understanding of the invention.

DESCRIPTION OF RELATED ART

The increase in the demand for multimedia services, particularly the transmission of digitized images, and the specialized interconnections of local area networks comprising an increasing number of processors interconnected with one another, require higher and higher speeds under strict limitations in terms of cost, transmission time, space and the integrity of the transmitted information.

The high-speed serial links of the prior art, particularly the serial links of the SDH type that use a link constituted by two opposite one-way point-to-point links, are no longer able to meet the demand for speeds that can exceed several tens of GB/s, typically exceeding or equalling 50 GB/s. Such speeds are reached especially when a large number of processors are communicating with one another in a data processing machine or a network connecting several machines to one another.

The limitation due to the maximum allowable speed affects the latency of a data processing machine, which is an important parameter to consider in the efficiency of a multi-module machine, especially when the distance between the modules is large and/or when the number of processors communicating with one another is large.

One solution for solving this problem consists of parallelizing several point-to-point links.

One particular solution of this type is known from the document entitled "High Performance Parallel Interface-Mechanical, Electrical and Signalling Protocol Specification (HPPI-PH)," published in "X3T11 Maintenance Copy of American National Standard X3.183-1991." This document describes a parallel point-to-point interface for transmitting digital data at speeds of 800 or 1600 Mb/s between data processing machines, which data is conveyed through twisted pairs of copper wires over distances of more than 25 m.

However, this solution runs into the major problem of the deviation of the propagation times in the parallel links, also known as "skew," which makes it necessary to solve the problem of resynchronizing the data conveyed through each line on reception.

This problem is even more difficult to solve when the operating frequency of the modules is high.

In fact, at frequencies higher than 200 MHz, for which the skews become greater than the bit period, the static deviations are substantial, and in complex configurations the sum of the contributions of the skews for a 10-meter link can reach 10 ns. For a 10-meter link, there is typically a maximum of 4 ns in the cables and two times 3 ns in the transceivers.

If the information contained in the messages to be transmitted through a given number of links is distributed at a rate of 1 bit per link, the deviations cause the information to arrive at the ends of the links at different instants. The problem is that for a frequency of 200 MHz, or 5 ns after the departure of the information, the bits arrive in the wrong order, and is no longer known which message the bits received at the end of the link belong to.

SUMMARY OF THE INVENTION

The object of the invention is specifically to eliminate these drawbacks.

Another object of the present invention is to offer a physical interface structure capable of supporting speeds of several GB/s, typically greater than or equal to 5 GB/s, through 16 channels, or 2.5 Gb/s per channel, in cables having a skew on the order of ±4 ns.

Hereinafter, the term "channel" will be used to define the level of parallelization of a link and the term "cable" will be used to define the physical medium of the links.

Likewise, the unit GB/s means gigabytes per second and the unit Gb/s means gigabits per second: a byte corresponds to an octet, or 8 bits.

The skew of ±4 ns, which corresponds to a length of several meters, should be compared to a bit period, typically on the order of 0.4 ns, and a frame header, on the order of 50 ns.

The bit period therefore has a lower order of magnitude than the skew, while the duration of the header has a higher order of magnitude than the skew. It is known to increase the bit period by increasing the number of parallelized channels, but the number of physical connection points must remain compatible with the dimensions of a mass-produced card.

For this reason, the first subject of the invention is a process for interconnection between data processing or data communication modules by means of high-speed point-to-point serial links conveying multiplexed information, organized into frames and comprising a start-of-frame recognition pattern, of the type consisting of parallelizing several high-speed channels, making it possible to increase the flow of information exchanged between the modules.

The process according to the invention is characterized in that it consists, on transmission and on reception, of performing an analog synchronization of the basic clocks of each module to a reference clock generated by a module designated among the modules as a reference module, called the master module, the other modules being called slave modules, and of digitally synchronizing the start-of-frame of each slave module to the start-of frame sent by the master module.

According to one characteristic, for the analog synchronization on transmission, the process consists of:

extracting the basic clock signals of each slave module from the signals conveyed through each of the respective links connecting the master module to the slave modules;

frequency-locking and phase-locking each slave module to the data of one channel, chosen as the master channel, coming from the master module; and from the basic clock signals, generating in each slave module a new clock signal with a given frequency higher than its own clock frequency, conveyed by the link connecting the slave module to the master module, and with a cycle imposed by the clock of the master module.

According to another characteristic, for the digital synchronization on transmission, it consists of:

detecting the start-of-frame conveyed through each link;

digitally aligning the start-of-frame of each channel with the start-of-frame pattern sent by the master module.

According to another characteristic, for the analog synchronization on reception, it consists of:

designating a master channel among all of the channels forming the link connecting each slave module to the, master module;

from the data conveyed through the master channel, extracting the clock signal sent by the module connected to the link; and generating a clock signal with a frequency higher than the frequency of the extracted clock signal, to be used as a sampling frequency for the respective data signals extracted from the other links.

According to another characteristic, for the digital synchronization on reception, it consists of digitally aligning, to the nearest bit, all of the starts-of-frame of the links with the starts-of frame of the master link, at a given frequency corresponding to the throughput of the data conveyed through each of the links.

According to another characteristic, there is an overlap of all the headers related to each link.

Another subject of the present invention is an interconnection interface for implementing the above process.

The interface is characterized in that it comprises, in each module:

multiplexing means associated with each serial link, disposed in the physical layer of the module, making it possible to distribute the data transmitted through the global link at a speed determined by the sending module to a given number of parallel links, each parallel link conveying part of the data at a speed higher than the speed of the data blocks sent by the sending module; and means for demultiplexing the given number of parallel links respectively conveying the data parts received, in order to reconstitute the data that has passed through the interconnection interface, synchronously and with integrity, at a speed corresponding to the speed allowable by the receiving module.

According to another characteristic, the multiplexing/ demultiplexing means comprise a sending block and a receiving block, the sending block comprising a plurality of clock generating blocks and the receiving block comprising a plurality of clock retrieving blocks, each generating block using the sending logic for a given link to which it is connected, the sending block synchronizing the plurality of generating blocks, and each retrieving block using receiving means for a given link, the receiving block defining the clock domain related to the reception of the given number of links connected to the same module.

According to another characteristic, each clock retrieving block comprises:

a logical circuit that senses the leading edges of the data signal conveyed through the link to which it is connected, making it possible to extract a pure and substantially fixed clock frequency from the data transmitted through the link; and a phase-locked oscillator that receives the clock frequency output by the logical circuit.

According to another characteristic, the receiving blocks include a device for correcting the deviation of the propagation times in the parallel links, also called the skew.

According to another characteristic, the skew correcting device comprises:

means for generating a local receiving clock from the signal received from the master link;

means for phase-shifting the signals received from the slave links;

means for sampling the phase-shifted signals at a rate imposed by the local receiving clock;

means for phase-shifting the sampled signals in the signal received from the slave link, the logical contents of the phase-shifted signals corresponding to a bit shift defined by a given whole number of periods STM-N, where N corresponds to the level of interleaving; and means defining a window for operating the phase-shifting means specific to each slave link, the phase-shifting means being active in the phase preceding the detection of the start bit and inactive during the transfer of the rest of the frame.

The digital synchronization of the frames is achieved through a digital alignment of the recognition patterns, hereinafter called "start bits," contained in the starts-of-frame provided according to the SDH data transport protocol.

The present invention uses the detection of each start-of-frame and the periodicity of these frames to perform a precise logical synchronization of the information transported by the frames.

One advantage of the present invention is that it specifically separates the logical transport layers from the physical layers for access to the media.

BRIEF DESCRIPTION OF THE DRAWINGS

Other advantages and characteristics of the present invention will emerge through the reading of the following description given in reference to the attached figures, which represent:

FIG. 1, the format of a basic frame according to the SDH protocol;

FIG. 2a, a timing diagram of the multiplexing cycle of the basic frames;

FIG. 2b, a timing diagram of the data flow in relation to the multiplexing cycle illustrated in FIG. 2a;

FIG. 3, the format of a multiplexed frame STM-N according to the SDH protocol;

FIG. 10, the format of the recognition patterns A1, A2 of the headers STM-N;

FIGS. 11a and 11b, the timing diagrams respectively illustrating tw~ links synchronized on transmission, their patterns A1, A2 being aligned;

FIGS. 12a and 12b, the same respective links on reception, showing the phase-shifts of the data received;

FIG. 17, Process flow chart of process operating in transmission of data mode.

FIG. 18, process flow chart of process operating in reception of data mode.

Figure 5:
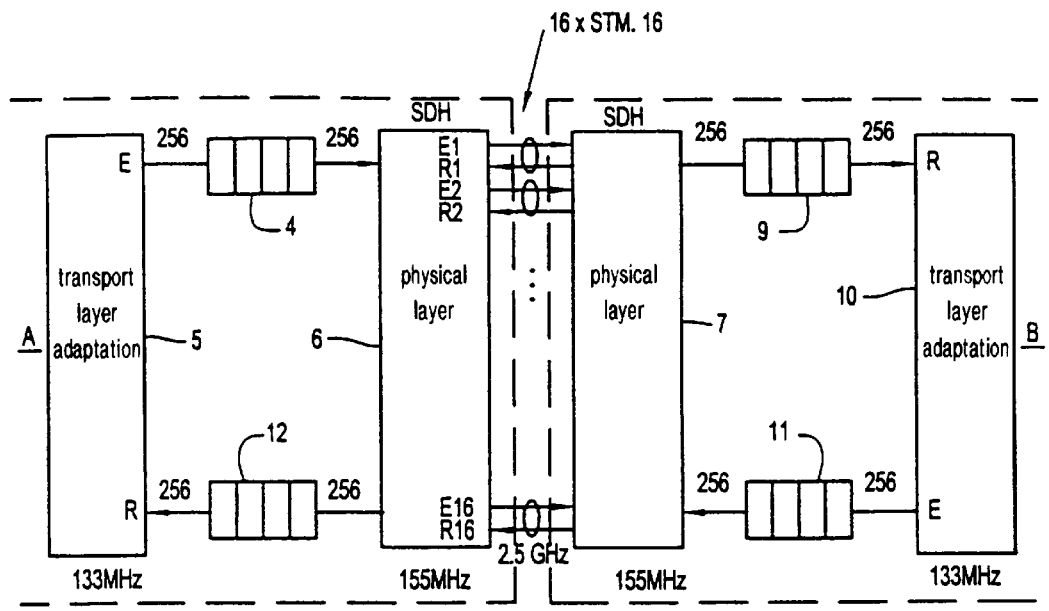
FIG. 5 a block diagram of an interconnection interface for implementing the process according to the invention.

The principle of the SDH protocol being presumed to be known, it is described below in general terms, in reference to FIGS. 1 through 4.

A first remarkable property of this protocol consists of imposing a frequency synchronization of the basic clocks of the various modules interconnected to one another, at the same nominal frequency of 155.520 MHz and its multiples of 4.

The local oscillators of the modules are locked onto a given clock cycle, received through one of the input/output ports of the equipment housing each module.

A clock with a highly stable frequency is installed in each module, which defines the transmission cycle, and one module is designated as a reference module for the synchronization of the local clocks of the other modules.

In case of a failure of a link, the SDH protocol also provides for the use of a reserve link, one per group of two to fifteen elementary serial links, and defines the reconfiguration protocols of the APS type, the abbreviation for "Automatic Protection Switching."

The concept of SDH hierarchy is based on a particular frame structure called a "basic frame," the format of which is illustrated in FIG. 1.

The frame position multiplexing cycle is illustrated by the timing diagram of FIG. 2a, and the data flow by the timing diagram of FIG. 2b.

The format of a multiplexed frame according to the SDH protocol is illustrated by FIG. 3.

The SDH hierarchy is obtained by interleaving a given number N of basic frames STM-1, resulting in speeds that are multiples of 4 times 155 Mb/s (622 Mb/s, 2.5 Gb/s, etc.).

The basic frame is based on the multiplex STM-1, from the abbreviation for "Synchronous Transfer Module." It is organized into 9 rows of 270 bytes each.

Each row is divided into 9 header bytes and 261 data bytes for a usable speed on the order of 140 Mb/s.

The start of each frame is marked by a synchronization pattern A1A2 at the beginning of the header.

The bytes B1, B2 are parity control bytes.

The positional multiplexing of the SDH is organized into stacked frames of 125 $\mu$s, called hierarchical levels STM of level N, for which the basic unit defined by the SDH protocol, associated with the multiplex STM-1, is the virtual container VC-4.

A multiplexed component, called a "tributary," has a reserved space called a "virtual container VCi", which has pointing and operating elements to which a justification byte, used in case of a phase shift, is added. The positional justification by pointer and the interleaving by bytes allows direct access to a tributary.

As illustrated in FIG. 2a, the user flow is interrupted every 13.9 $\mu$s by the SDH control flow. Once every 9 times, or every 125 $\mu$s, this control flow contains the synchronization pattern A1A2.

The pointers H1, H2 ensure the justification of the cycle of the multiplexing and define the value of the phase-shift between the virtual container VCi and the frame.

The bytes ±1 define the dynamic adjustment zone of the containers within the frames.

The timing diagram of FIG. 2b makes it possible to show the data offset between the virtual container VCi and the frame.

FIG. 3 illustrates a level of interleaving N, in which a number N of pointers H1 and H2 respectively point to N virtual containers VCi, each virtual container VCi having a header containing a byte Ji defining the format of the next container.

The present invention uses two types of synchronization:

an analogue frequency synchronization of the basic clocks; and a logical synchronization of the start-of-frame recognition patterns in all the links, for example the SDH start-of-frame patterns as defined in guideline G.708.

The first synchronization is performed with a whole number of clock cycles, from the "logical" point of view. This synchronization guarantees that the various clock signals are in phase. However, it does not make it possible to determine the whole number of clock cycles required to convey all of the information to be transmitted.

The second synchronization performs a digital alignment of the SDH start-of-frame recognition patterns in all of the links.

The differences obtained, in a whole number of bits, by the digital alignment devices operating between the master link and each slave link make it possible to deduce the number of clock cycles required for the full restoration of the information transmitted.

Using this second remarkable property of the protocol SDH, which is that it has a means for identifying the start of a frame, the invention defines a logical bit counting reference, hereinafter called a "start bit."

Figure 4:
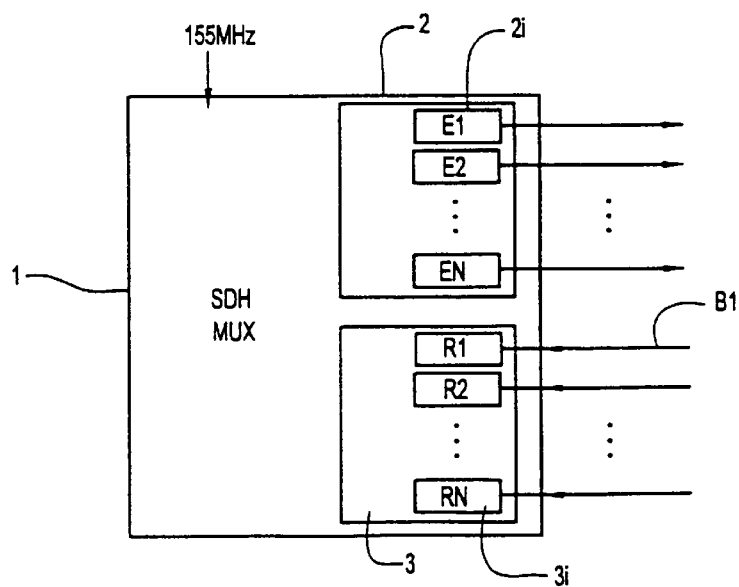
FIG. 4, diagram of an SDH multiplexer-demultiplexer with N channels.

FIG. 4 schematically illustrates an SDH multiplexer 1, with N channels operating at the clock rate of 155 MHz.

The term multiplexer, MUX, is used to define both the multiplexing and demultiplexing functions.

The multiplexer 1 comprises a sending block 2 and a receiving block 3, which respectively comprise clock signal generating blocks 2i and clock signal retrieving blocks 3i.

The generating blocks 2i used in the present description use the SDH sending logic for a link STM-16.

The sending block 2 contains and synchronizes all of the generating blocks 2i sending to the same module.

The retrieving blocks 3i use the SDH receiving circuits for a link STM-16.

The receiving block 3 defines the clock domain related to the reception of all of the links STM-16 from the same module.

During the initialization of the system, one particular channel is chosen in the master module for each link with a slave module. This channel is the master channel for the corresponding link.

The sending clocks of the slave channels are all derived from the sending clock of the master channel chosen. In particular, the frequencies are equal and the possible phase shifts are precisely controlled in the clock domain of the sending block.

The retrieving block 3i extracts the clock signal conveyed through the link and executes a decoding of the line code CMI, the abbreviation for "Coded Mark Inversion." The signal issued from the CMI decoder represents the data received in code NRZ, the abbreviation for "Non-Return to Zero."

The CMI code is defined in the ITU-T guidelines.

This type of coding has the following advantages:

simplicity;

it includes at least one level transition in each interval 3T/2, where T corresponds to the period of one bit;

a capability for the retrieval of the clock signal by a device PLL, the abbreviation for "Phase-Locked Loop"; and the absence of a DC component, hence possible links through a capacitor or high-frequency transformer.

In the exemplary embodiment presented, which considers serial links STM-16 according to the SDH protocol, where the number 6 corresponds to the level N of interlacing of the basic frame STM-1, each link is capable of conveying throughputs of 2.5 Gb/s.

For a logical unit corresponding to a 256-bit word, the process according to the invention makes it possible, for example, to send this word through 16 parallel links STM-16.

The block diagram of FIG. 5 illustrates an example of 16 links STM-16, each conveying throughputs of 2.5 Gb/s between two modules A and B in 256-bit packets or words. The modules A and B are respectively delimited by an open broken line. The modules A and B are, for example, multiprocessor modules.

The time required for the transmission and the reconstruction of the transmitted messages depends directly on the maximum speed allowable by the links connecting the modules A and B to one another.

In this example, the module A sends 256-bit words as input to a first FIFO memory 4, the abbreviation for "First In First Out," from a transport layer adaptation block 5, at a clock rate of 133 MHz.

There is a relationship that must be maintained between the "bit" width of the parallel transport interface, the "bit" width of the physical serial interface, i.e., the number of serial channels of the link, and the physical clock and transport frequencies, in order to optimize the use of the resources of the system.

This relationship can be expressed by the following equality: "Bit" width of the parallel interface*frequency of the transport clock="bit" width of the serial interface*frequency of the physical clock of the link.

However, this equality cannot be achieved in a way that is absolutely exact. Therefore, the transport layer adds messages of the "idle" type to the transmission whenever the usable messages do not saturate the throughput of the physical layer. These "idle" messages are then simply eliminated from the flow by the receiving transport layer.

The words sent by the module A are transmitted to the physical layer block 6 of the module A at a clock rate of 155 MHz, then transmitted to the physical layer block 7 of the module B via the link SDH, at a clock rate of 2.5 GHz.

The messages received by the physical layer block 7 of the module B are then transmitted in the form of 256-bit words as input to a second FIFO 9, at a clock rate of 155 MHz, then to the transport layer adaptation block 10 of the module B that receives the message, at a clock rate of 133 MHz.

In symmetrical fashion, the module B sends 256-bit words through a third FIFO memory 11, from the transport layer adaptation block 10, at a clock rate of 133 MHz.

The words sent by the module B are transmitted to the physical layer block 7 at a clock rate of 155 MHz, then transmitted to the physical layer block 6 of the module A, via the link SDH, at a clock rate of 2.5 GHz.

The messages received by the physical layer block 6 of the module A are then transmitted in the form of a 256-bit word, through a fourth FIFO 12, at a clock rate of 155 MHz, to the transport layer adaptation block 5 of the module A, which receives the message at a clock rate of 133 MHz.

The various elements described above define a physical interconnection interface between two modules A and B, connected to one another by a plurality of point-to-point serial links, respectively conveying the data frames sent and received by each module.

Figure 6:
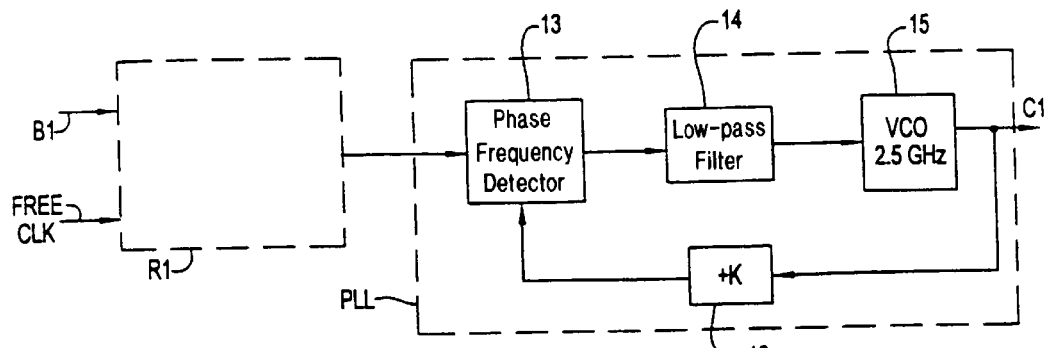
FIG. 6, a block diagram illustrating the principle of a phase-locked loop.

FIG. 6 illustrates a block diagram of a phase-locked loop PLL, which receives the signal output from a shaping block R1, delimited by a closed broken line. The shaping block R1 receives as input the signal B1 and the clock signal FREE CLK.

The oscillating device PLL delimited by a closed broken line includes, in series from the input to the output, a phase/frequency detector 13 receiving through a first input the signal delivered by the shaping block R1, a low-pass filter 14 and a 2.5-GHz VCO 15, the abbreviation for "Voltage Controlled Oscillator," phase-locked to the frequency of 2.5 GHz.

The output from the VCO 15, which also corresponds to the output of the oscillating device PLL, is looped back to a second input of the detector 13 via a logical divider by K 16. The output from the oscillating device PLL delivers a basic clock signal, also called a local reception signal C1.

Figure 7:
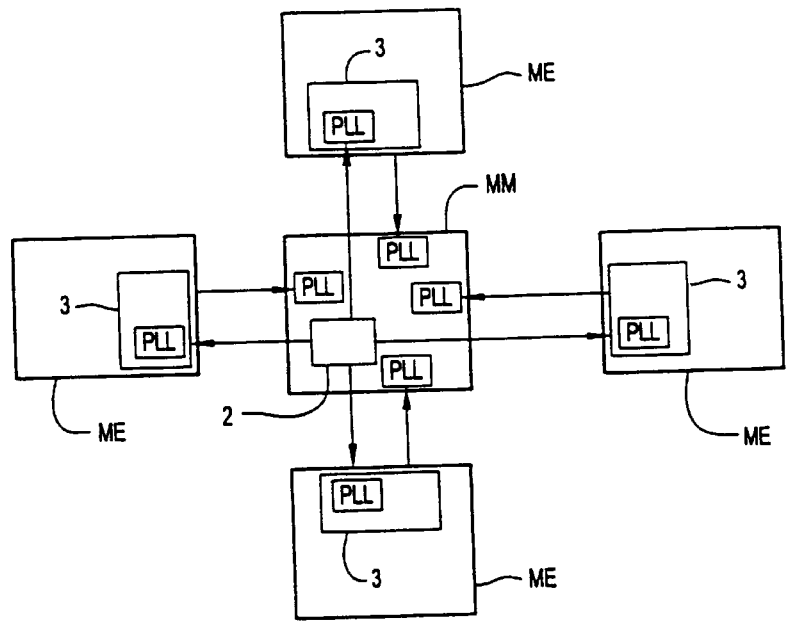
FIG. 7, a block diagram illustrating the principle for synchronizing the clocks of the slave modules to the clock of the master module.

The synchronization of the basic clocks on transmission is performed as follows, in reference to FIG. 7:

the oscillators of the sending block 2 of the master module MM receive the same clock output from a quartz oscillator;

the clock cycle of the sending module is conveyed through the master channel of each link SDH at the same time as the data sent by the module;

the PLL of the receiving block 3 of each slave module ME is frequency-locked and phase-locked to the data coming from the master module MM; and the sending clocks of the slave modules ME are derived from the PLLs of their receiving blocks 3 by a standard analog sending PLL.

Figure 8:
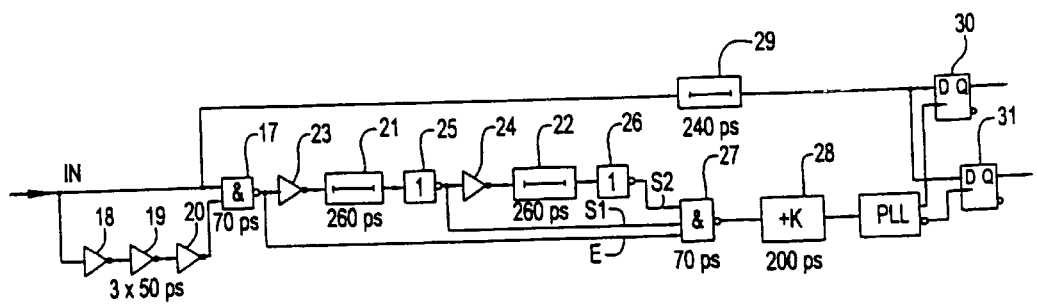
FIG. 8, a block diagram of a circuit for retrieving the clock signal conveyed through a master channel, according to the invention.

The block diagram of FIG. 8 illustrates a high-frequency circuit that makes it possible to extract the clock cycle of the data flow passing through a serial line STM-16 coded according to the above-mentioned CMI coding.

The time interval T within which a data item is coded is called a cell.

The CMI code is defined by the following coding rules:

a "0" is represented by a high-to-low transition in the middle of the cell; and a "1" is represented by a stable state during the cell; this state alternating between high and low with each bit "1" on input.

A string of "0s" is therefore represented by a square signal with a period T and a string of "1s" by a square signal with a period 2T.

This type of encoding is not the best performing in terms of spectral occupancy, but it works well in the context of the example described.

In particular, it is possible to exploit the following consequence of the CMI coding rules for the retrieval of the clock at 2.5 GHz:

only low-to-high transitions are located at the start of a cell; and the maximum interval between two low-to-high transitions is equal to 3T, in this case "101" with the first "1" coded in the high state.

According to FIG. 8, the encoded signal IN is derived through a NAND gate 17 and a series of three inverters 18, 19, 20. Each low-to-high transition generates a negative pulse of 150 ps. These pulses are applied to two electronic delay lines 21 and 22 of the type described in European, patent EP 0 562 904 B1, serialized.

Each delay line 21 and 22, associated with its input buffers, respectively 23 and 24, and possible output buffers, respectively 25 and 26, is set for a delay of T, or 400 ps in the example described.

The input E and the two respective outputs S1 and S2 from the output buffers 25 and 26 are added by a NAND gate 27 to three inputs E, S1, S2, which generates positive pulses of 150 ps in width, at the frequency of 2.5 GHz. This signal is divided by a binary divider by K 28, with K typically equalling 2 to 8, in order to produce a square signal whose frequency is compatible with the standard circuit of the phase comparator 13 of the block PLL.

Finally, a 240-ps delay line 29 adjusts the phase of the encoded input signal, in order to guarantee a correct sampling by the retrieved clock.

The two latches 30 and 31, on the right in FIG. 8, respectively correspond to the input stages of a standard CMI decoder, not represented. They receive through their respective inputs D the signal delivered by the delay line 29, and through their respective clock inputs the clock signal delivered by the block PLL: a direct signal for the latch 30 and a complementary signal for the latch 31.

The sampling of the encoded signal IN, in the ascending and descending leading edges of the retrieved clock, makes it possible to distinguish the "0," for which there is a change of state, and the "1," for which the state remains stable.

The precise adjustment of the phase between the retrieved clock and the input signal takes place during the initialization phase of the master link.

The initialization means, not shown in detail, can find the adjustment for the delay line 29 by sending a string of "1s" through the line, by searching for the operating limits of the retrieving circuit 3i, i.e., the adjustments for which "0s" appear as output, and by choosing the median value of the delay.

After the basic clocks have been synchronized on transmission, the data delivered by the multiplexer 1 of the link SDH at the clock frequency of 155 MHz, is subjected to a so-called "serialization" process for the purpose of transforming the 16 parallel flows of 16 bits into 16 links STM-16 at the frequency of 2.5 GHz.

Figure 9:
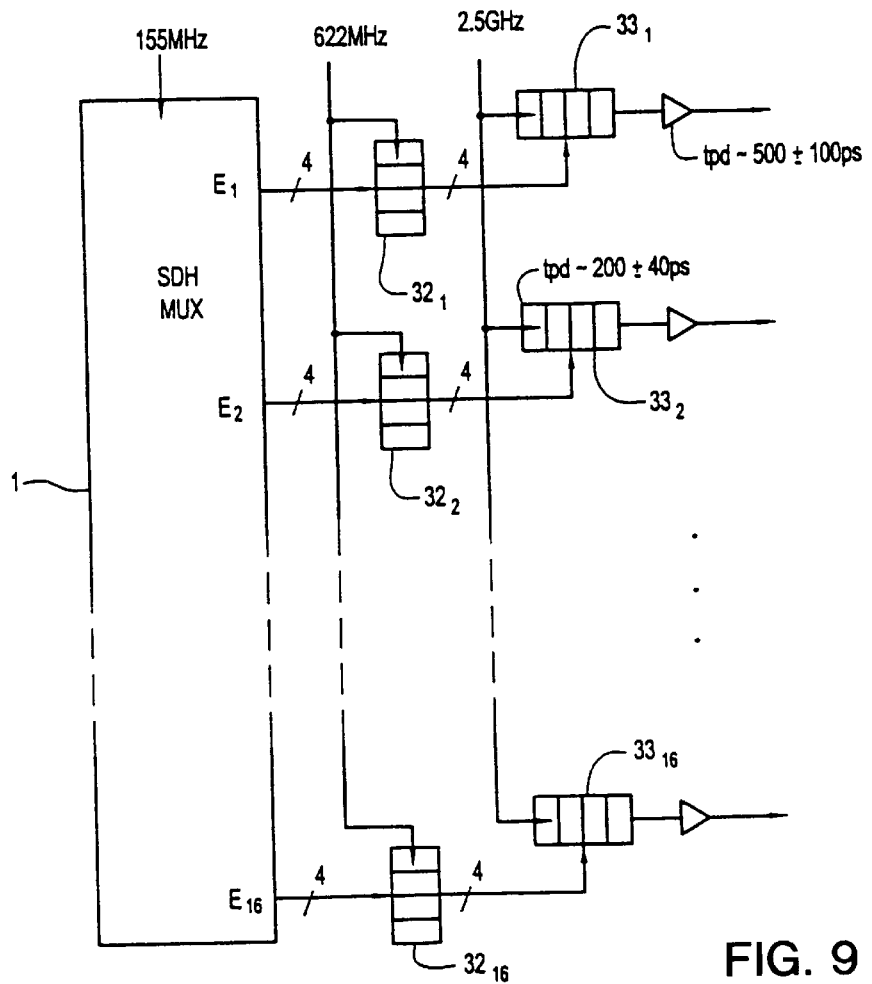
FIG. 9, a block diagram illustrating the process for serializing the parallel data flows to be transferred through the link, according to the invention.

The serialization operation, the main means for which are illustrated schematically by the block diagram of FIG. 9, consists of breaking down the flows, or 16-bit words, into 4-bit words, and of loading them into first and second shift registers, respectively.

To do this, in a first step, the storage of the first 4-bit words in the first registers 32i is performed at the clock frequency of 622 MHz, then in a second step, the second 4-bit words are loaded into the second registers 33i at the clock frequency of 2.5 GHz.

FIG. 9 indicates some typical time deviation values tpd with the HCMOS-8 technology, which refers to semiconductor components whose geometry is less than or equal to 0.18 μm.

It is not necessary to precisely adjust the skew in the sending blocks 2i, since it is much lower than the values of the deviations encountered in the cables.

The sending logic at 2.5 GHz,is therefore limited to a few logical circuit components and thus remains controllable in terms of the space it requires in the ASICs, the abbreviation for "Application Specific Integrated Circuit."

After an analog synchronization of the basic clocks on transmission and a parallel-to-serial transformation of the data sent have been performed, the process according to the present invention consists of digitally synchronizing the frames sent through the links STM-16.

The purpose of the digital synchronization is to align the frames in all of the links to the nearest bit, at the frequency of 2.5 GHz.

To do this, the process consists of using the start bit contained in the header of the frame STM-N sent through the master channel to synchronize the slave channels.

The corresponding circuits are not shown in detail. The synchronization consists of inhibiting the slave multiplexers 1 until the occurrence of the synchronization signal sent by the master channel.

This synchronization ensures the recovery of all the headers of the frames related to each channel.

The transmission time of each header is independent of the level of interleaving and has a magnitude greater than the deviation between channels, in the example described 150 ns as compared to ±4 ns.

For the return channel, each slave module ME, using a phase-shifting unit synchronized to its local clock, aligns its sending start bit with the start bit received from the master.

The analog part of a phase-shifting unit of this type is specifically described in European patent EP 0 562 904 B1 filed by the Applicant.

No matter what the level of interleaving N, the detection of the start bit takes place at the transition between two predetermined consecutive bytes, respectively A1 and A2, called the pattern A1A2.

The format of the synchronization bytes of the headers for the frames STM-N is defined by ITU guideline G.708 and is illustrated in FIG. 10.

For a frame STM-N, the bytes A1 and A2 are repeated 3*N times at the start of each frame, where N is the level of interleaving of the frames.

The first byte A1 has, for example, a value of 1111 0110 (F6 in hexadecimal) and the second byte A2 has for example a value of 0010 1000 (28 in hexadecimal). Hence, the following synchronization pattern is obtained for STM-16: 48 times 1111 0110 concatenated with 48 times 0010 1000.

After a serialization of the data, all of the data sent is scrambled by a pseudorandom data generator, with the exception of the 2(3*N) first bytes of the headers. The probability that the scrambled data contains the pattern A1A2 is therefore infinitesimal.

A new synchronization to the next header is initiated within a time window generated from the preceding header, making the probability of finding a duplicate of the synchronization code practically zero.

A device, not represented, for detecting the transitions between the byte string A1 and the byte string A2 comprises:, for example, a 16-bit comparator that compares the data output from the serialization process with the constant pattern A1A2.

The generalization of the definition of the SDH header to STM-N makes the position of the start bit independent in time and in the data flow.

Likewise, the time window and the temporal position of the transition between the pattern A1 and A2 within the window are independent of the level of interleaving N.

In order to resume the operations performed to synchronize the frames on transmission, the process according to the invention consists, in a first step, of performing an analog synchronization of the sending slave clock to the receiving clock regenerated from the master channel received from the master module, and in a second step, of numerically aligning the slave start bits to the master start bits.

The synchronization on transmission uses circuits operating at high frequencies, typically greater than or equal to 2.5 GHz (PLL, shift registers, etc.). These circuits are technically known and can be produced using HCMOS-8 technology so that they can be integrated into an ASIC that also supports the other functionalities of the interconnection interface.

Moreover, the other logical circuits used are elementary in design and small for the technologies used.

While the synchronization on transmission can seem easy to accomplish (all the data packets are sent at the same time), the synchronization on reception can seem impossible when it requires being able to handle the packets arriving in scrambled order, in parallel, in order to reconstruct with integrity the information transmitted via the 16 links STM-16.

FIGS. 11a and 11b respectively illustrate two links synchronized on transmission, their start-of-frame recognition patterns A1 being aligned within the tolerances of FIG. 9.

FIGS. 12a and 12b respectively illustrate the same links on reception, showing is the phase shifts of the data received.

According to the invention, the principal of the synchronization on reception consists of retrieving the clock signals from each link coming from a given module as soon as they are received, in order to produce a single clock in the receiving module as soon as possible.

First, we will consider the analog synchronization of the receiving physical clock, and second, the digital alignment of the start bits received via links coming from a given module.

We will start with the hypothesis that since the channels come from the same module, the variations of dynamic origin of the clock periods related to each channel are identical from one channel to another.

Therefore, on arrival, only the period variations of static origin, which are a function of the mechanical and electrical conditions specific to each channel remain.

The "jitters" can therefore be considered to involve only variations of the second type, the thermal signal-to-noise ratio linked to the attenuation of the signals in the transmission lines being very high in the case of the short links in question.

The slave module ME is assumed to have already been synchronized to the master module MM on transmission.

Figure 13:
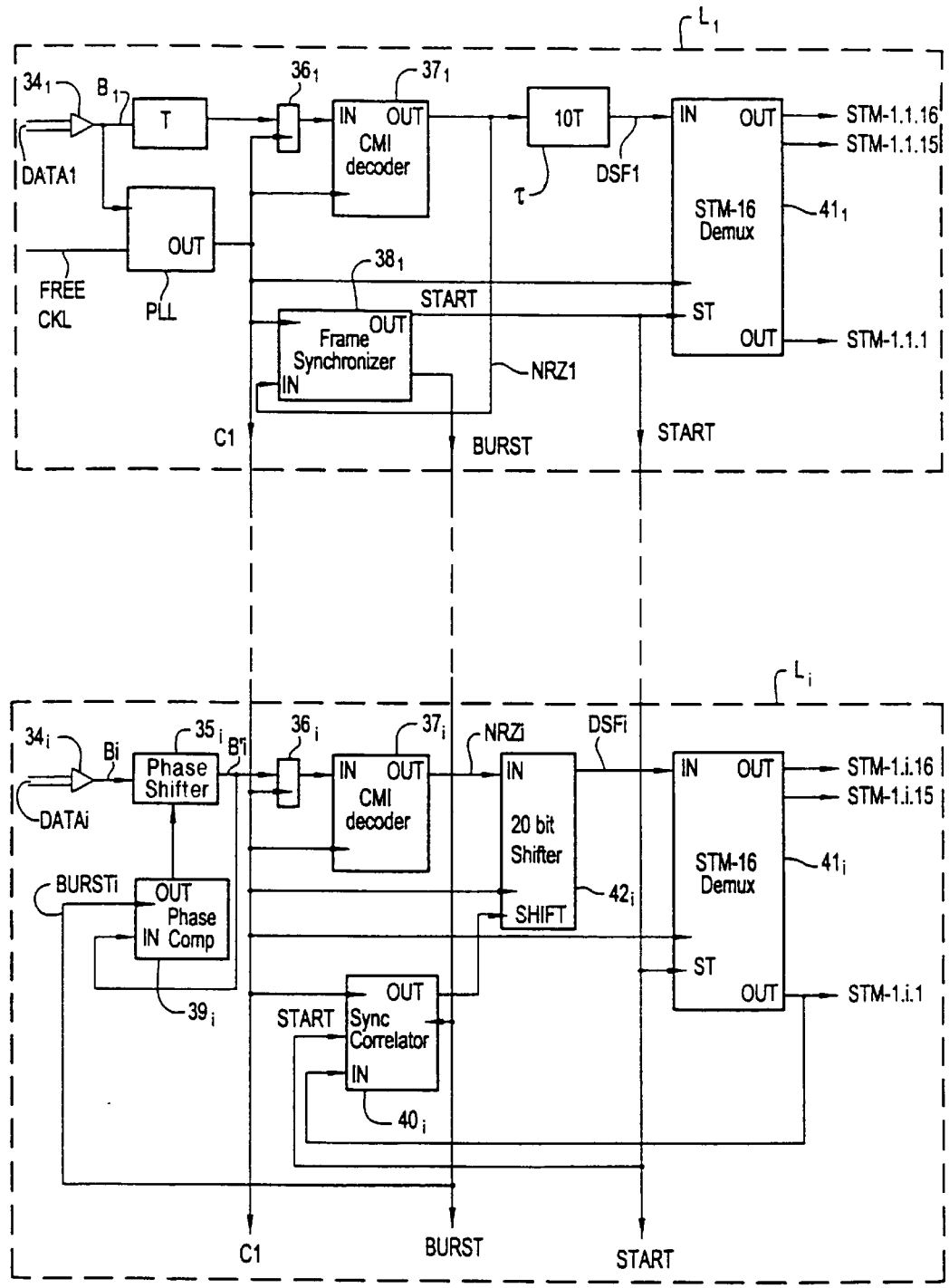
FIG. 13 a device for correcting skews on reception, according to the invention.

FIG. 13 illustrates a skew correction device installed in a receiving block 3.

Among all of the links Li arriving in the receiving block, one link L1 conveying the data DATA1, is designated as the master link for the 16 links STM-16.

The clock signal B1 received by the receiving block 3 is extracted from the data received DATA1 and is then transformed into a basic clock signal, or local receiving clock signal C1 by a clock retrieving circuit 3i like the one described above and illustrated in FIG. 8. The master link L1 then imposes the master clock signal C1 on the other links Li.

For the other links Li, the clock signals Ci are not extracted from the data received DATAi but the signals Bi conveying the data received DATAi are phase-shifted so that they can be sampled at the rate imposed by the master clock C1 of the master link L1.

The problem of implanting several PLLs in the same ASIC, known to be technologically difficult, is thus avoided.

The operation of the skew correction device is described below in reference to FIG. 13.

Differential amplifiers $34i$ transform the analog signals conveyed by the interconnect cable connecting the two modules into logical signals B1 through Bi.

A PLL is continuously locked onto the signal B1 from the master link, and it generates the local receiving clock C1. This clock is distributed, possibly by means of amplifiers not represented, into the clock domain of the receiving block 3.

Phase-shifting units $35i$, used in the slave links, make it possible to delay the signals Bi from 0 to 2T, T representing the bit period of the signals in the cable.

These phase-shifting units $35i$ can be embodied according to the invention described in European patent EP 0 562 904 B1, entitled "Process and Device for Multirange Delay Adjustment."

For purposes of symmetry, the master input is equipped with the same device.

The adjustment is arbitrarily set at the value T, symbolized in FIG. 13 by the block T, and the phases of the signals Gi can therefore be adjusted from 0 to T in either direction from the central value defined by the phase of B1.

"Latches" $36i$ synchronize the signals B1 through Bi to the clock C1, thus eliminating all the time deviations within a period T.

CMI decoders $37i$ transform the binary signals output from the latches $36i$ into NRZ signals. The corresponding circuits are part of the prior art and therefore are not described.

In FIG. 13, the signal BURST is a "bundle," i.e. a group of signals BURST.1 through BURST.n. These signals are generated by decodings of the state of the demultiplexer 1 STM-16 and are synchronous with the clock C1. This representation is used to improve the readability of the figure; the differentiating details are provided in the following description.

The signal NRZ1 from the master link enters the terminal IN of a frame synchronizer $38_1$. This synchronous logical block is controlled by the clock C1 and generates the signals START, which define the transition between the bytes A1 and A2, and the signal BURST.1 or MSYNC, which corresponds to a burst of two pulses at a frequency of 1/4T in the embodiment presented, distributed to phase comparators $39i$ of the slave links.

Each phase comparator $39i$ measures the shift between the signal B'i output from the phase-shifting unit $35i$, and the signal MSYNC issued from the frame synchronizer $38_1$, and stores the corresponding value in an output register until the next frame, or 125 $\mu$s later. These digital values are then presented to the control inputs of the phase-shifting units $35i$.

For each slave link, the signal START output from the frame synchronizer $38_i$, enters a synchronization correlating block $40_i$. The demultiplexer 1 STM-16 of the link Li supplies the signal STM-1.i.1 to the input IN of the correlator $40_i$. The corresponding circuits are part of the prior art and therefore are not described.

The signal STM-1.i.1 has the format of a basic frame STM-1 at 155 Mb/s. The correlator $40i$ determines the transition instant A1, A2 of this frame and compares it to the signal START output from the frame synchronizer $38_1$ of the link L1.

The correlator $40i$ runs at the rate of the clock C1. The internal counters of the correlator $40i$ can, for example, measure a phase-shift from 0 to 20 periods C1. The result of this measurement is stored in an output register. This value can be re-updated every 125 μs.

For each slave channel, a bit-shifting circuit 42$i$, or "shifter," receives in a first input the signal NRZi output from the CMI decoder 37$i$ and shifts this signal by a given value corresponding to the result of the measurement of the shift contained in the output register of the correlator 40$i$. This shift value, or control signal, is injected into a second input SHIFT of the shifter 42$i$ corresponding to the control input of an internal multiplexer, not represented. The shift, in the example described, is therefore 20 bits.

The shifter 42$i$ generates through its output a signal DSFi conveying the realigned frame STM-16. These signals are then transmitted to the inputs IN of the SDH demultiplexing blocks 41$i$. For the master link, the signal DSF1 is the signal NRZ1 delayed by a given delay T=10T.

The demultiplexers 41$i$ de-interleave the frames STM-1 that compose the frame STM-16 and supply at the output of the receiving block 3 the 256 input signals from the transport layer, not detailed in the present description.

The phase comparator 39$i$ and the synchronization correlator 40$i$ are described below in reference to FIGS. 14 and 15, respectively.

Figure 14:
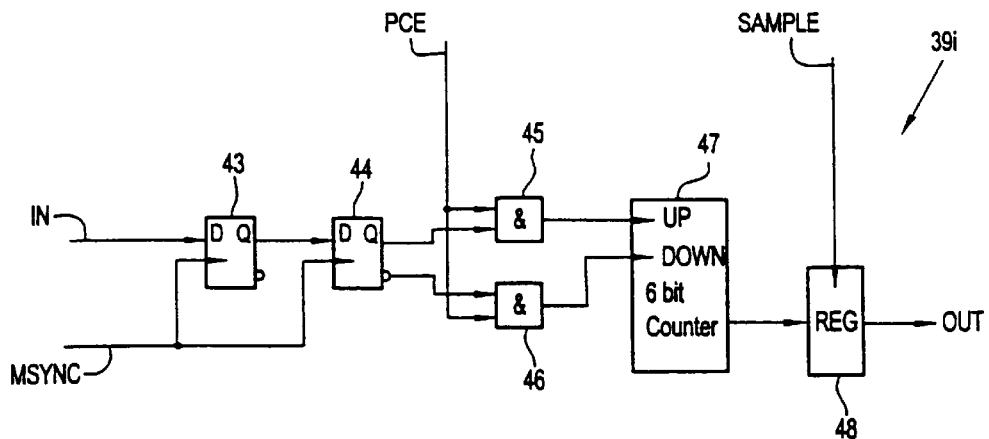
FIG. 14 a block diagram of the phase comparator of the skew correcting device of FIG. 13.

As illustrated in FIG. 14, a first latch 43 receives through its input D the signal output from the analog phase-shifting unit 35$i$, and through its clock input the signal MSYNC corresponding to the signal BURST.1 output from the frame synchronizer 38$_1$. This latch 43 makes it possible to determine whether the phase of the signal from the slave link is ahead or behind relative to the reference burst MSYNC.

A second latch 44 resynchronizes the signal output from the first latch 43. The second latch 44 has the effect of minimizing the potential effects of "metastability" occurring in the case where the output from the counter 47 changes at the same instant as the signal MSYNC.

The signal PCE, the abbreviation for "Phase Count Enable," which corresponds to the signal BURST.3, is generated by the frame synchronizer 38$_1$, and makes it possible to take the state of the second latch 44 through a first and a second AND gate, respectively 45 and 46, in order to advance or set back a counter 47. This counter 47 changes every 125 μs. For a phase-shifting unit whose amplitude of adjustment is equal to 2 periods T of 0.4 ns, if a 6 bit counter is chosen, each increment of the counter 47 represents a time of about 12 ps.

A signal SAMPLE, or BURST.4, is generated by the frame synchronizer 38$_1$ and stores the value of the counter 47 in an output register 48. The output OUT from this register 48 determines the value of the delay generated by the phase-shifting unit 35$i$.

Figure 15:
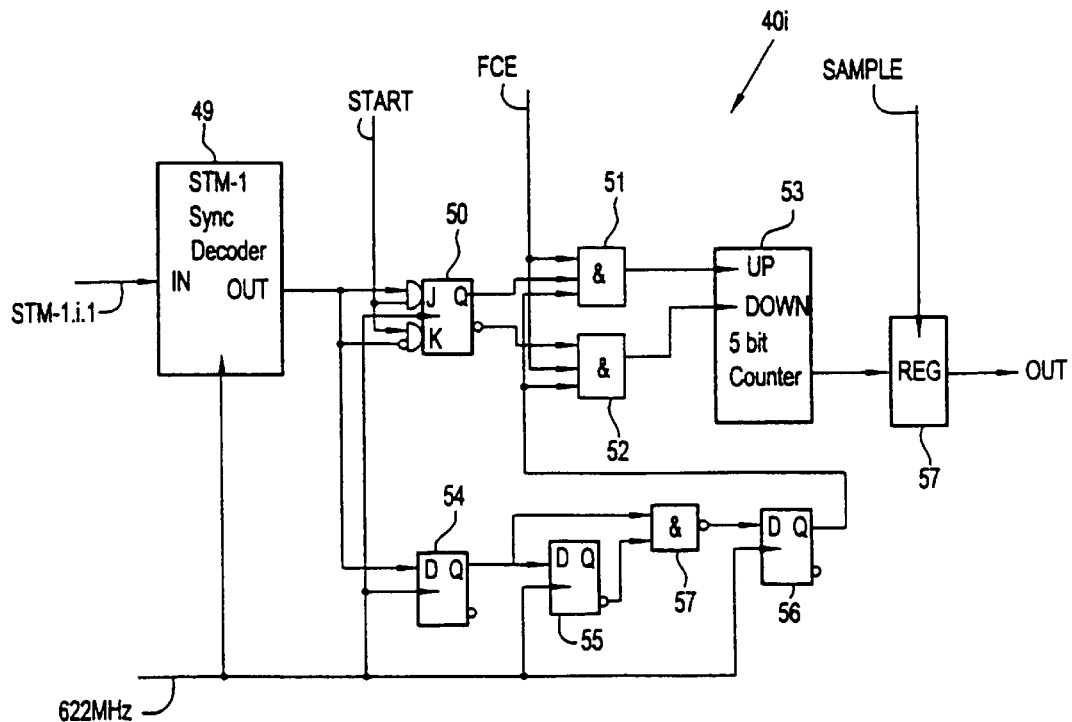
FIG. 15, a block diagram of the synchronization correlator of the skew correcting device of FIG. 13.

As illustrated in FIG. 15, the synchronization correlator 40$i$ comprises a synchronization decoder STM-1 49.

The corresponding circuit is part of the prior art, and therefore is not described in detail. It runs at the rate of the 622-MHz clock signal output from the frame synchronizer 38$_1$ and receives through its input IN the serial signal STM 1.$i$.1, which is the channel 1 of the link STM-16. The decoder 49 generates a signal OUT, which makes it possible to determine the position of the start bit of the channel.

A first latch 50 is a JK latch with conditional inputs. It makes it possible to determine whether the start bit generated by the decoder 49 is ahead or behind relative to the start bit of the master link carried by the signal START of FIG. 13.

A signal FCE, the abbreviation for "Frame Count Enable," or BURST.5, is generated by the frame synchronizer 38$_1$ and makes it possible to take the state of the first latch 50 through a first and a second AND gate, respectively 51 and 52, in order to advance or set back a counter 53.

A series of latches 54, 55 and 56 and a NAND gate 57 detect the time coincidence between the two start bits and inhibit the outputs of the first and second gates ET 51 and 52.

The counter 53 changes every 125 μs until the synchronization-is complete, then remains unchanged. The maximum synchronization time in the example described is 20 times 125 μs.

The signal SAMPLE, or BURST.4, is generated by the frame synchronizer 38$_1$, and stores the value of the counter 53 in a register 57. The output OUT from this register determines the value of the delay generated by the associated shifter 42$i$.

When the analog synchronization of the links Li coming from the same module has been performed, the process according to the invention then consists of digitally aligning the start bits in the receiving block.

To do this, in the receiving block 3, the start bits related to the frames STM-16 are digitally aligned with the master start bit.

Figure 16:
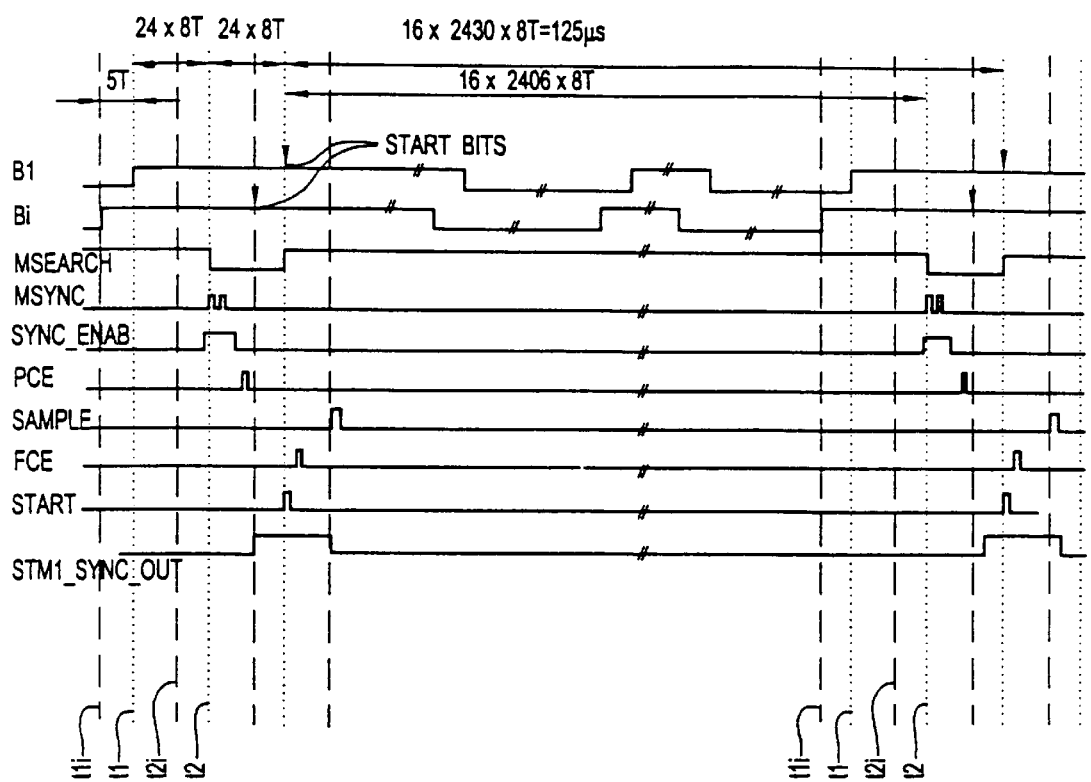
FIG. 16, timing diagrams illustrating the temporal relationships between the basic signals of the skew correction device.

FIG. 16 represents the timing diagrams for an exemplary "timing" between the master channel and one of the slave channels.

At the line level, the signal Bi,is 5 bits ahead of B1. The 48 synchronization bytes A1 start at t1 for the master link and at t1$i$ for the slave link.

This exemplary "timing" takes place during the phase of digital alignment between the two channels.

The signal MSEARCH is generated by a synchronous counter of B1, not represented. It makes it possible to calculate to the nearest bit the center position of the byte string A1, represented by the instant t2. The start bit is located 24 bits after that.

The signal MSYNC is the reference burst derived from the signal B1 that allows the circuit of FIG. 14 to perform the phase alignment within the time T, equal to 400 ps in the example described.

The limited complexity of the circuits makes it possible, with the technologies in question, to concentrate the implantation of 16 alignment blocks on a silicon surface smaller than 1 mm$^2$, thus guaranteeing a skew control among these blocks of better than 5 ps.

The signal SYNC_ENAB frames the burst MSYNC. The signal PCE advances or sets back the counter of FIG. 14.

The signal SAMPLE stores in the output registers 48 and 57 of the devices 39$i$ and 40$i$, respectively illustrated by FIGS. 14 and 15, the new values of the alignment variables. The signal FCE advances or sets back the counter 53 of FIG. 15.

The signal START output from the frame synchronization block 38$_1$ of the master link L1, remains in phase with the instant t1.

In the example chosen, the signal STM1_SYNC_OUT generated by the STM-1 decoder 49 of FIG. 15, as seen on the left side of FIG. 16, is synchronous with the start bit of the signal Bi. On the right side of the same figure, it is delayed by the digital alignment device in the direction of the start bit of the master link. The various timing diagrams are not to scale.

In a SAN, the abbreviation for "System Area Network," for a multiprocessor, the propagation times are typically on the order of 10 ns, and the uncertainty in the propagation time is on the order of ±4 ns, or ±40%, the 10 ns being chiefly due to the cable length.

The principal of the alignment on transmission described above guarantees that the maximum offset between the reception of a slave start bit and the master start bit remains less than the inter-channel deviations.

The capacity of the receiving FIFOs is typically on the order of 32 bits per link STM-16, which value depends on the reaction time of the transport layer to the flow interruptions caused by the SDH headers.

In the normal operating mode, the pointers of the SDH frame headers retain a constant value.

In case of a loss of synchronization to the master clock, the pointer mechanism of the SDH protocol, which makes it possible to absorb the frequency offsets, is implemented. The updating of the pointers is strictly identical for each channel, the deviation being the same for all the channels at the physical layer of a link.

This operating mode can also be used to advantage to make two modules communicate via a plesiochronous link, i.e., one in which the basic clocks are very close, but not synchronized, for example for the case where a data processing system has to interface with a data communication system without being able to act on the basic clocks of the latter.

The invention also applies to the case where a number M of channels STM-N coming from a module are again multiplexed and demultiplexed by nodes of the WDM type, the abbreviation for "Wavelength Division Multiplexer."

WDM equipment uses, on the multiplexer end, a number M of lasers offset by several tens of GHz, transmitting simultaneously through the same fiber, and on the demultiplexer end 1, an optical device that divides the beam received among a number M of photodetectors.

The skew between the various channels of such a multiplexer, which is relatively independent of the length of the link, is compatible with the values for which the device presented works.

With WDM technology, it is possible to extend the length of the parallel link described herein to several kilometers, since the attenuation problems are eliminated.

Finally, the present invention is not limited to the use of the SDH protocol only, and is compatible with other data transport protocols in a system that meets the following conditions:
  a speed that reconciles the requirements of the transport protocol with the capabilities offered by the network of serial-to-parallel links; and
  the existence of periodic control signals accessible to the logical interface of the physical layer of the system.

The process of the present invention may be summarized as follows, having reference to FIGS. 17 and 18.

The process for interconnection between data processing or data communication modules by means of high-speed point-to-point serial links conveying multiplexed information, organized into frames and comprising a start-of-frame recognition pattern, is of the type consisting of parallelizing several high-speed channels, for increasing the flow of information exchanged between the modules, and includes performing, on transmission and on reception, an analog synchronization 300 of basic clocks of each module to a reference clock generated by a reference module designated among the modules as a reference module, with the reference module comprising a master module (MM), and the other modules comprising slave modules (ME), and a digital synchronization 308 of a start-of-frame of each slave module (ME) to a start-of-frame sent by the master module (MM).

The analog synchronization on transmission preferably comprises:
  extracting basic clock signals of each slave module (ME) 302 from signals conveyed through each of respective links connecting the master module (MM) to the slave modules (ME);
  frequency-locking and phase-locking each slave module (ME) to data of one channel 304, chosen as a master channel, coming from the master module (MM);
  generating in each slave module (ME) from the basic clock signals, a new clock signal 306 with a given frequency higher than the original clock frequency of the slave module (ME), conveyed through the link connecting the slave module (ME) to the master module (MM), and with a cycle imposed by the clock of the master module (MM).

The synchronization on transmission 308 preferably comprises:
  detecting a start-of-frame conveyed through each link 310; and
  digitally aligning a start-of-frame of each channel with a start-of-frame pattern sent by the master module (MM) 312.

The analog synchronization on reception 400 preferably comprises:
  designating a master channel (L1) 402 among all of the channels forming the link connecting each slave module (ME) to the master module (MM);
  extracting the clock signal 404 sent by the module connected to the link from the data conveyed through the master channel (Li); and
  generating a clock signal (C1) 406 with a frequency higher than the frequency of the extracted clock signal, to be used as a sampling frequency for the respective data signals extracted from the other links (Li).

The digital synchronization on reception also preferably includes the step 408 of digitally aligning, to the nearest bit, all of the starts-of-frame of the links to the starts-of-frame of the master link, at a given frequency corresponding to the throughput of the data conveyed through each of the links.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

What is claimed is:

1. A process for interconnection between data processing or data communication modules by means of high-speed point-to-point serial links conveying multiplexed information, organized into frames and comprising a start-of-frame recognition pattern, of the type consisting of parallelizing several high-speed channels, for increasing the flow of information exchanged between the modules, comprising performing, on transmission and on reception, an analog synchronization of basic clocks of each module to a reference clock generated by a reference module designated among the modules as a reference module, said reference module comprising a master module (MM), the other modules comprising slave modules (ME), and a digital synchronization of a start-of-frame of each slave module (ME) to a start-of-frame sent by the master module (MM).

2. A process according to claim 1, characterized in that for the analog synchronization on transmission, comprises:
  extracting basic clock signals of each slave module (ME) from signals conveyed through each of respective links connecting the master module (MM) to the slave modules (ME);

frequency-locking and phase-locking each slave module (ME) to data of one channel, chosen as a master channel, coming from the master module (MM);

generating in each slave module (ME) from the basic clock signals, a new clock signal with a given frequency higher than the original clock frequency of the slave module (ME), conveyed through the link connecting the slave module (ME) to the master module (MM), and with a cycle imposed by the clock of the master module (MM).

3. A process according to claim 1, characterized in that digital synchronization on transmission, comprises:

detecting a start-of-frame conveyed through each link; and digitally aligning a start-of-frame of each channel with a start-of-frame pattern sent by the master module (MM).

4. A process according to claim 2, characterized in that digital synchronization on transmission, comprises:

detecting a start-of-frame conveyed through each link; and digitally aligning a start-of-frame of each channel with a start-of-frame pattern sent by the master module (MM).

5. A process according to claim 1, characterized in that for the analog synchronization on reception, comprises:

designating a master channel (L1) among all of the channels forming the link connecting each slave module (ME) to the master module (MM);

extracting the clock signal sent by the module connected to the link from the data conveyed through the master channel (Li); and generating a clock signal (C1) with a frequency higher than the frequency of the extracted clock signal, to be used as a sampling frequency for the respective data signals extracted from the other links (Li).

6. A process according to claim 2, characterized in that for the analog synchronization on reception, comprises:

designating a master channel (L1) among all of the channels forming the link connecting each slave module (ME) to the master module (MM);

extracting the clock signal sent by the module connected to the link from the data conveyed through the master channel (Li); and generating a clock signal (C1) with a frequency higher than the frequency of the extracted clock signal, to be used as a sampling frequency for the respective data signals extracted from the other links (Li).

7. A process according to claim 3, characterized in that for the analog synchronization on reception, comprises:

designating a master channel (L1) among all of the channels forming the link connecting each slave module (ME) to the master module (MM);

extracting the clock signal sent by the module connected to the link from the data conveyed through the master channel (Li) and generating a clock signal (C1) with a frequency higher than the frequency of the extracted clock signal, to be used as a sampling frequency for the respective data signals extracted from the other links (Li).

8. A process according to claim 4, characterized in that for the analog synchronization on reception, comprises:

designating a master channel (L1) among all of the channels forming the link connecting each slave module (ME) to the master module (MM);

extracting the clock signal sent by the module connected to the link from the data conveyed through the master channel (Li); and generating a clock signal (C1) with a frequency higher than the frequency of the extracted clock signal, to be used as a sampling frequency for the respective data signals extracted from the other links (Li).

9. A process according to claim 1, characterized in that digital synchronization on reception, includes the step of digitally aligning, to the nearest bit, all of the starts-of-frame of the links to the starts-of-frame of the master link, at a given frequency corresponding to the throughput of the data conveyed through each of the links.

10. A process according to claim 2, characterized in that digital synchronization on reception, includes the step of digitally aligning, to the nearest bit, all of the starts-of-frame of the links to the starts-of-frame of the master link, at a given frequency corresponding to the throughput of the data conveyed through each of the links.

11. A process according to claim 3, characterized in that digital synchronization on reception, includes the step of digitally aligning, to the nearest bit, all of the starts-of-frame of the links to the starts-of-frame of the master link, at a given frequency corresponding to the throughput of the data conveyed through each of the links.

12. A process according to claim 4, characterized in that digital synchronization on reception, includes the step of digitally aligning, to the nearest bit, all of the starts-of-frame of the links to the starts-of-frame of the master link, at a given frequency corresponding to the throughput of the data conveyed through each of the links.

13. A process according to claim 5, characterized in that digital synchronization on reception, includes the step of digitally aligning, to the nearest bit, all of the starts-of-frame of the links to the starts-of-frame of the master link, at a given frequency corresponding to the throughput of the data conveyed through each of the links.

14. A process according to claim 1, further comprising defining a logical bit counting reference, called a "start bit," corresponding to a means for identifying the start-of-frame contained in the header of each frame and characterized in that there is an overlay of all the headers related to each link.

15. A process according to claim 2, further comprising defining a logical bit counting reference, called a "start bit," corresponding to a means for identifying the start-of-frame contained in the header of each frame and characterized in that there is an overlay of all the headers related to each link.

16. A process according to claim 3, further comprising defining a logical bit counting reference, called a "start bit," corresponding to a means for identifying the start-of-frame contained in the header of each frame and characterized in that there is an overlay of all the headers related to each link.

17. A process according to claim 5, further comprising defining a logical bit counting reference, called a "start bit," corresponding to a means for identifying the start-of-frame contained in the header of each frame and characterized in that there is an overlay of all the headers related to each link.

18. A process according to claim 8, further comprising defining a logical bit counting reference, called a "start bit," corresponding to a means for identifying the start-of-frame contained in the header of each frame and characterized in that there is an overlay of all the headers related to each link.

19. A process according to claim 14, further comprising using the start bit sent by the master module (MM) to synchronize each slave module (ME).

20. A process according to claim 19, characterized in that each slave module (ME), for each channel, aligns a sending start bit of each slave channel with a start bit received from the master module (MM) through the master channel.

21. A process according to claim 1, characterized in that the frames are organized in accordance with the Synchronous Digital Hierarchy protocol (SDH).

* * * * *